US011882019B1

(12) United States Patent
Lindem, III et al.

(10) Patent No.: US 11,882,019 B1
(45) Date of Patent: Jan. 23, 2024

(54) SOURCE ADDRESS VALIDATION FOR ASYMMETRIC ROUTING

(71) Applicant: Cisco Technology, Inc., San Jose, CA (US)

(72) Inventors: Alfred Clarence Lindem, III, Cary, NC (US); Peter Psenak, Bratislava (SK); Lester C Ginsberg, Mount Hermon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/091,824

(22) Filed: Dec. 30, 2022

Related U.S. Application Data

(60) Provisional application No. 63/391,663, filed on Jul. 22, 2022.

(51) Int. Cl.
*H04L 45/02* (2022.01)
*H04L 45/122* (2022.01)
*H04L 45/00* (2022.01)

(52) U.S. Cl.
CPC ............ *H04L 45/122* (2013.01); *H04L 45/02* (2013.01); *H04L 45/20* (2013.01)

(58) Field of Classification Search
CPC ........ H04L 45/122; H04L 45/02; H04L 45/20

USPC ......................................................... 709/238
See application file for complete search history.

(56) References Cited

U.S. PATENT DOCUMENTS

| 9,973,387 B1 | 5/2018 | Li et al. |
| 2006/0262786 A1 | 11/2006 | Shimizu et al. |
| 2011/0069714 A1 | 3/2011 | Le Pennec et al. |
| 2018/0262942 A1 | 9/2018 | Andreasen et al. |

OTHER PUBLICATIONS

Costa et al., "Analyzing the Effects of Asymmetric Unicast Routes on Multicast Routing Protocols", Journal of the Brazilian Computer Society, vol. 7, Jan. 2001, pp. 5-15.

*Primary Examiner* — Anthony Mejia
(74) *Attorney, Agent, or Firm* — Lee & Hayes P.C.

(57) ABSTRACT

Techniques are described for providing a method and apparatus for determining source address validation of a data packet in a network in the presence of asymmetric routing. When a data packet is received by a node such as a router, a reverse path forwarding lookup is performed to determine if the data packet was received on a next-hop interface and if the reverse path forwarding fails, a Shortest Path First (SPF) computation at the router advertising the source route will be performed using the link state database to determine whether the data packet arrived from a valid path of the network.

20 Claims, 10 Drawing Sheets

SOURCE ADDRESS VALIDATION FOR ASYMMETRIC ROUTING

RELATED APPLICATIONS

This application claims priority to U.S. Provisional Patent Application No. 63/391,663, filed Jul. 22, 2022, the entire contents of which are incorporated herein by reference.

TECHNICAL FIELD

The present disclosure relates generally to network security and more particularly to a method and system for performing source address validation in an asymmetrical routing environment.

BACKGROUND

Vast amounts of data are continuously sent and received over computer networks such as network domains, wide area networks and the internet. As the amount and importance of such data increases so does the need for increased security of data networks to protect against various threats. Once such security threat includes "spoofing", wherein a malicious node such as a router imitates a valid node or router of a network such as a domain. Such a malicious node can then attempt to gain access to sensitive data within the network or install malicious software such as malware, ransomware or spyware into devices connected to the network.

Source address validation techniques have been developed which can employ a Reverse Path Forwarding (RPF) lookup on a data packet source address to determine whether the packet arrived on an interface leading to the source. RPF is a method which can be used to prevent IP address spoofing and other security challenges. This method is called reverse path forwarding because instead of looking forward, the technology handling packet trajectory can look back to check the reverse path of the packet. The packet can then be forwarded or dropped based on the findings of the RPF. Because many consumer-facing technologies now use these systems, the actual engineering of RPF and other methods has become increasingly important.

The Unicast Reverse Path Forwarding feature limits malicious traffic on a network. This feature enables device to verify the reachability of the source address in packets that are being forwarded and limit the appearance of spoofed or malformed addresses on the network. If the source IP address is not valid, reverse path forwarding protocol discards the packet.

Reverse Path forwarding helps to mitigate problems that are caused by the introduction of malformed or forged (spoofed) IP source addresses into a network by discarding IP packets that lack verifiable IP source addresses. For example, a number of common types of denial-of-service (DoS) attacks, including Smurf and Tribal Flood Network (TFN), can take advantage of forged or rapidly changing source IP addresses to allow attackers to thwart efforts to locate or filter these attacks. For Internet service providers that provide public access, reverse path forwarding deflects such attacks by forwarding only packets that have source addresses that are valid and consistent with the Internet Protocol (IP) routing table of a node, thereby protecting the network of the Internet service provider.

Using RPF to validate the source of a data packet, however, can fail in the presence of asymmetric routing. Asymmetric routing occurs when a packet traverses from a source to a destination along one path and follows a different path when it returns to the source. This can happen, for example, in Layer-3 routed networks.

In an asymmetric routing environment, RPF cannot be used to verify the validity of a data packet in order to prevent malicious spoofing attacks, because the packet does not arrive on an interface from which it would be sent. Therefore, preventing such spoofing attacks in an asymmetric routing environment presents significant challenges, because at present there is no way to accurately validate a data packet using RPF in such an asymmetric routing environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
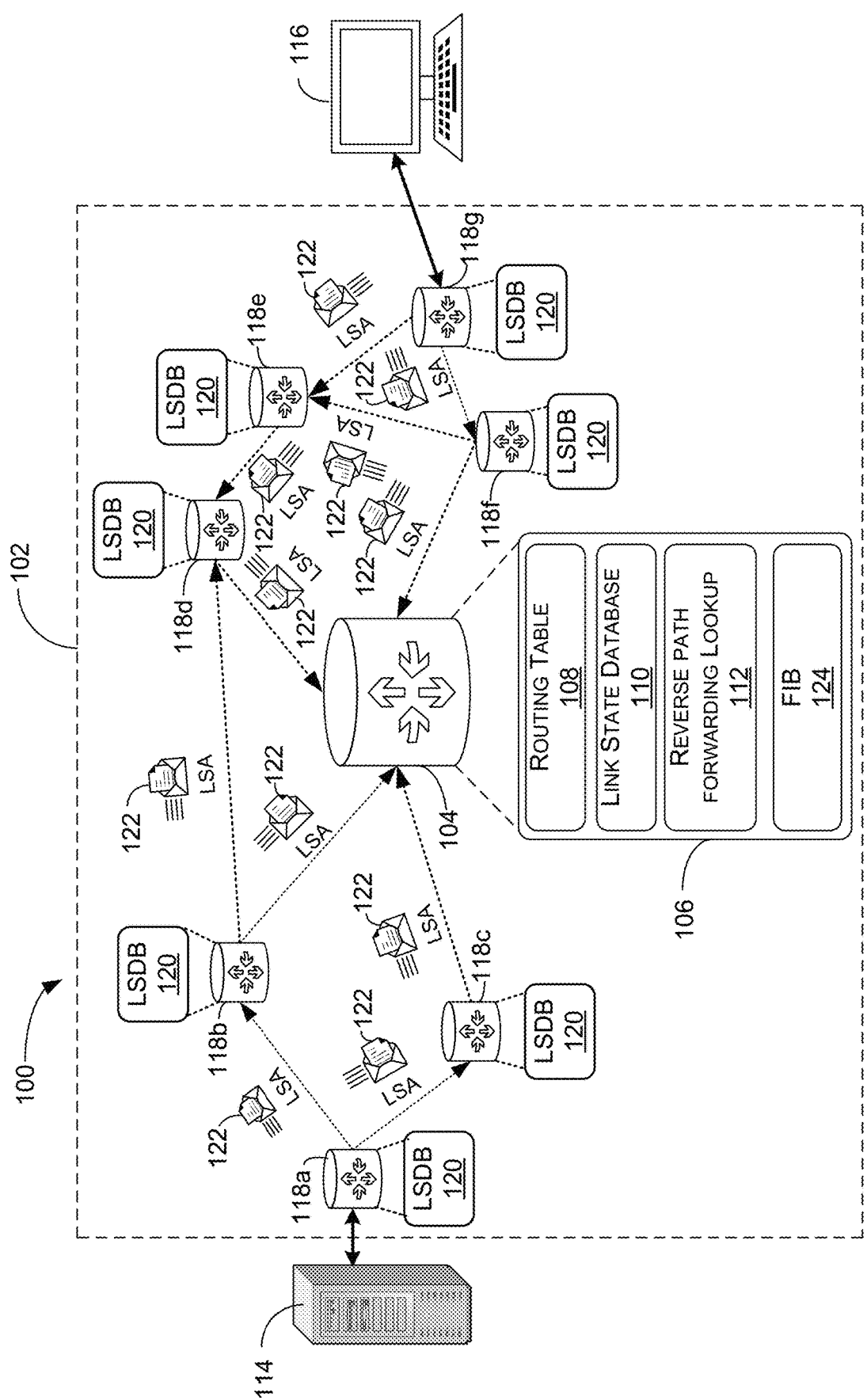
FIG. 1 illustrates a schematic of a computer network domain including a node configured to perform source validation.

This disclosure describes various technologies for determining whether a data packet received by a computer network switching device was received from a valid interface and either forwarding or dropping the data packet accordingly. By way of example, and not limitation, a method according to the technologies described herein may include a method performed by a network switching device connected with a computer network. In one embodiment, the network switching device can receive network topology information from a node of the computer network. A link-state database of the network switching device can be updated based on the network topology information. A data packet associated with a data flow between one or more nodes of the computer network and the network switching device can be received by the network switching device. A determination can be made as to whether the data packet was received from a Reverse Path Forwarding (RPF) interface. If it has been determined that the data packet was received from an RPF interface, the data packet can be sent to a next-hop node of the computer network. If it has been determined that the data packet was not received from an RPF interface, then a determination can be made as to whether the data packet was received from a valid path of the computer network by performing a Shortest Path First (SPF) computation rooted at the source node (router or switch), which may be performed using information in the link state database. If the data packet was received from a valid path, the data packet can be sent from the network switching device to a next-hop node of the computer network. If it has been determined that the data packet was not received from a valid path of the computer network based on the SPF calculation rooted at the source node, the data packet can be dropped.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for providing a method and system for performing source address validation in a computer network to ensure network security in a symmetric or asymmetric network routing environment. Network topology information is received by a node, such as a router or switching device. A link-state database is updated based on the received routing information to include valid routes of the computer network. A data packet is received by the node, and a determination is made as to whether the data packet was received from a reverse path forwarding address. If the data packet was received from a reverse path forwarding address, then the data packet is forwarded to a next-hop node. If the data packet was not received from a reverse path forwarding address, then a determination is made as to whether the data packet was received from a valid path by performing a Shortest Path First (SPF) calculation rooted at the source router, i.e., the router advertising the route to the packet source. If the data packet was received from a valid path, then the data packet is forwarded to the next-hop node. If the data packet was not received from a valid path, then the data packet is dropped.

In one embodiment, the network topology information can be received from one or more nodes that have advertised network topology information to other nodes in the network. In one embodiment, the network topology information can be received from a node that has advertised network topology information to its next-hop nodes. In one embodiment, the data packet is sent from a source and next-hops for the source are computed. In one embodiment, if the data packet was received from a valid path, first-hops neighbors for the route are added to a reverse path forwarding database.

Source address spoofing is a serious threat to computer network security. By forging source IP addresses, an attacker can implement many kinds of attacks while hiding their actual identity. Such attacks can include attacker-in-the-middle attacks, reflective attacks, flood-based attacks, and poisoning attacks as well as others.

Source Address Validation (SAV) is an important tool for preventing such source address spoofing attacks. Static Access Control List (ACL) and strict unicast Reverse Path Forwarding (uRPF) are two solutions for providing source address validation. ACL-based source address validation configures matching rules to specify which source prefixes are acceptable. However, it requires manual configuration to update. To overcome this challenge, strict uRPF automatically achieves Source Address Validation (SAV) based on local routing information. It checks each source address in the Forwarding Information Base (FIB) and requires that the incoming interface should be the same as the forwarding interface to the source.

Reverse Path Forwarding (RPF) can be used to check the source address of an incoming data packet. With unicast traffic, this can be used as a security check. When the router receives a packet, it checks if the source is known and/or the interface that it received the packet on is used to reach the source. If not, packets can be dropped.

When a router or network switching device receives unicast IP data packets, it checks the destination IP address of the IP data packet so that it can forward the data packet to the next-hop node in the computer network. If the IP data packet needs to be routed, the router or network switching device will check the routing table for the destination IP address, select the correct interface, and the data packet will be forwarded. In that regard, the router or switching device doesn't care about source IP addresses as that is not important for forwarding decisions. However, if the router does not check the source IP address, it can be possible for attackers to spoof the source IP address and send packets that normally might have been dropped by a firewall or access list. Unicast Reverse Path Forwarding (uRPF) is a security feature that prevents these spoofing attacks. Whenever the router or switching device receives an IP packet, it will check to see whether the IP data packet has a matching entry in the routing table for the source IP address. If there is no matching entry for the source IP address, the packet will be discarded. Unicast Reverse Path Forwarding can have two modes, (1) strict mode and (2) loose mode.

Strict mode Unicast Reverse Path Forwarding means that the router will perform two checks for all incoming packets on a certain interface. First, the router will determine whether there is a matching entry for the source in the routing table. Second, the router will determine whether it uses the same interface to reach this source as that on which the packet was received.

When the incoming IP data packet passes both checks, it will be permitted and forwarded. Otherwise, it will be dropped. This will work for Interior Gateway Protocol (IGP) routing protocols as long links have equal metrics in both directions since they use the shortest path to the source of the IP packets. The interface that is used to reach the source will be the same as the interface from which the router receives the packets.

In loose mode RPF, the router will only perform a single check when it receives an IP packet on an interface. It will only check whether it has a matching entry for the source in the routing table. If this check is passed, the packet is permitted and forwarded. It doesn't matter whether this interface was used to reach the source or not.

However, the use of Reverse Path Forwarding (RPF) for performing Source Address Validation (SAV) requires that data flow in data paths are symmetric throughout the network. Many companies, especially those with large networks, use asymmetric IP routing. Asymmetric routing is when network packets leave via one path and return via a different path. This approach makes sense from an efficiency and redundancy perspective. However, from a security perspective, asymmetric routing presents serious challenges.

To visualize and address the potential problems with asymmetric routing, one can imagine an organization that has one router on the top floor of its corporate headquarters and another on the ground floor. The top floor router sends enterprise traffic out, while the ground floor router receives it back. If an employee makes a connection to an enterprise application, the request goes out through the top floor router, into the data center, through web proxies, and on to the target application. The incoming return flow from the application, however, comes back through the ground floor router. In this scenario, it is impossible for anomaly and intrusion detection tools to do their job, because they are only seeing half of a conversation.

More specifically, performing Source Address Validation (SAV) using Reverse Path Forwarding protocols is ineffective in such an asymmetric network routing situation. Using RPF, when a router receives a packet on an interface that it uses to send packets toward the source, that interface is an RPF interface. When the packet arrives on the RPF interface, the router recognizes the interface as a valid interface and sends the packet to a next-hop node of the network. Using RPF, if the data packet arrives on an interface that is not the RPF interface, the data packet is dropped to prevent security breaches due to spoofing. Therefore, since RPF requires that the data packet arrive on the same interface that the router would use to send a data packet to the source, RPF cannot accommodate asymmetric route networking environments. The various embodiments as described herein below provide a method and system for performing Source Address Validation (SAV) that can be implemented in either a symmetric routing environment or an asymmetric routing environment. In this way, the described embodiments provide greatly improved flexibility in ensuring network security while meeting ever changing networking demands and designs.

There is no need for a completely new framework to solve the problem of performing Source Address Validation (SAV) in an asymmetric routing environment using an Internet Gateway Protocol (IGP). An Open Shortest Path First (OSPF) or Intermediate System to Intermediate System (IS-IS) router can perform Source Address Validation in the presence of asymmetric routing using existing topology information. In addition to the router interfaces that are valid for a given source address, the router can compute next-hops for the source of the received packets in the Internet Gateway Protocol (IGP) Domain. The IGP router link-state of the packet source network is readily available in the IS-IS or OSPF Link State Database (LSDB). The reverse Path Forwarding (RPF) lookup can then be updated to allow the additional next-hop interfaces in the RPF lookup of the source address. This additional computation would be optional and only applicable in Internet Gateway Protocol (IGP) domains with asymmetric routing.

When a router on a network route detects a packet on a non-RPF interface for a source, it can check to see whether a source Shortest Path First (SPF) computation has been done for the source router and whether that computation is still valid. If the computation has already been done and the receiving interface is not a valid path from the source router, the packet will be dropped. If the computation has not already been done, an SPF computation rooted at the IGP router advertising the route will be done. The SPF computation may be terminated once all of the Equal Cost Multipath (ECMP) routes from the source router to the computing router have been computed. This will yield first-hop neighbors for the route and their corresponding interfaces will be added to the valid RPF neighbors for the route.

This computation could be done in the background and could be of a lower priority than the base unicast routing computation. Packets failing the RPF check could be provisionally accepted or could be dropped pending the SPF computation. However, the data packet will not be queued while the SPF computation is pending. Additional next-hop interfaces for the inter-area routes may also be computed. However, if the SPF computation rooted at the IGP Area Border Router(s) (ABR(s)) contributing to the ECMP source route does not result in the incoming interface being added to the set of valid RPF interfaces, additional SPF computations rooted at the other ABRs for the source area could be required, since this could be indicative of asymmetric routing in the source area. Such additional computations could be optional.

The above describes an embodiment wherein additional source interfaces are computed by performing a Shortest Path First (SPF) computation rooted at the source. In another embodiment, a Shortest Path First (SPF) computation can be performed rooted at the local router but using the reverse metrics for all of the link costs, which can be referred to as a reverse Shortest Path First (SPF). This can be achieved by running a normal Shortest Path First (SPF) algorithm but using the link cost in the direction from the next-hop back toward the root instead of the link cost in the direction away from the root toward the next-hop.

FIG. 1 illustrates a schematic of a computer network 100. In one embodiment, the computer network 100 can be incorporated within a network domain 102. The network 100 includes a node 104, which can be a router or network switching device. The node 104 includes circuitry 106 (which may include computer hardware and/or software) for processing and storing network information regarding network routing. The circuitry 106 can include a routing table 108, a Link State Database (LSDB) 110, a Reverse Path Forwarding (RPF) lookup table or database 112, and a Forwarding Information Base (FIB). The computer network 100 can be connected with a source device 114, such as a server, computer or other device. In addition, the computer network 100 can be connected with a destination device 116, which can be an end user, computer server, or other device. The reference to device 114 as a source device and device 116 as a destination is, however, by way of example. Because data traffic can flow through the network 100 in more than one direction, at some points device 114 may function as a source and device 116 may function as a destination, while at other times device 114 may function as a destination and device 116 may function as a source.

The network 100 includes a plurality of nodes 118a-g, which can be routers or other switching devices configured to transmit data across the network 100. For purposes of clarity, the nodes 118a-g as well as the node 104 will be referred to herein as routers, although in some embodiments, the nodes 118a-g and 104 could be some other type of network switching device. In one embodiment, some or all of the routers 118a-g could be similar to the router 104, while in other embodiments some or all of the routers 118a-g could be different from the router 104 in some manner.

Each of the routers 118a-g includes its own Link State Database (LSDB) 120, wherein information regarding network routes can be stored. The routers 118a-g can communicate with one another regarding network routing information so that each of the routers can maintains an updated Link-State Database (LSDB) 120. For example, the LSDB 120 of router 118a includes next-hop information regarding routers 118 to which it is connected by a network connection (i.e., its interfaces). The router 118a can send a Link State Advertisement (LSA) 122 to its connected routers 118b, 118c. This can be referred to as "flooding" LSAs. Each of the routers 118b, 118c can then update its LSDB with this advertised routing information. The routers 118b, 118c can then send Link State Advertisements (LSAs) to their connected interface routers 104, 118d based on their updated LSDBs. This process can be continued until each of the routers 118, 104 has an updated LSDB including detailed information regarding the routing state of the network 100 including valid network paths and connections.

As a result of this process, the router 104 can maintain its routing table 108 and Link State Database (LSDB) 110 with detailed information regarding valid network paths of the network 100. The routing table 108 includes a set of rules, which in one embodiment can be in table format, that can be used to determine where data packets traveling over an Internet Protocol (IP) network will be directed. The routing table 108 contains information necessary to forward a data packet along the best path toward its destination. Each data packet (which will be discussed in greater detail herein below) contains information about its origin and destination. When a data packet is received, the router 104 examines the packet and matches it to the routing table entry providing the best match for its destination. The table provides the router 104 with instructions for sending the data packet to the next-hops on its route across the network.

The previously described Link State Advertisements (LSAs) 122 include detailed information about network topology. Open Shortest Path First (OSPF) as a link-state protocol uses these Link State Advertisements (LSAs) 122 to exchange the information about network topology between routers 118, 104. The router 104 stores this topology information in the Link-State Database (LSDB) 110. After the Link-State Databases 120, 110 are synced between the routers 118, 104, Open Shortest Path First (OSPF) protocol uses the shortest path first (SPF) algorithm to calculate the best routs. The best intra-domain routes are calculated in the router 104 (as well as routers 118).

Figure 2:
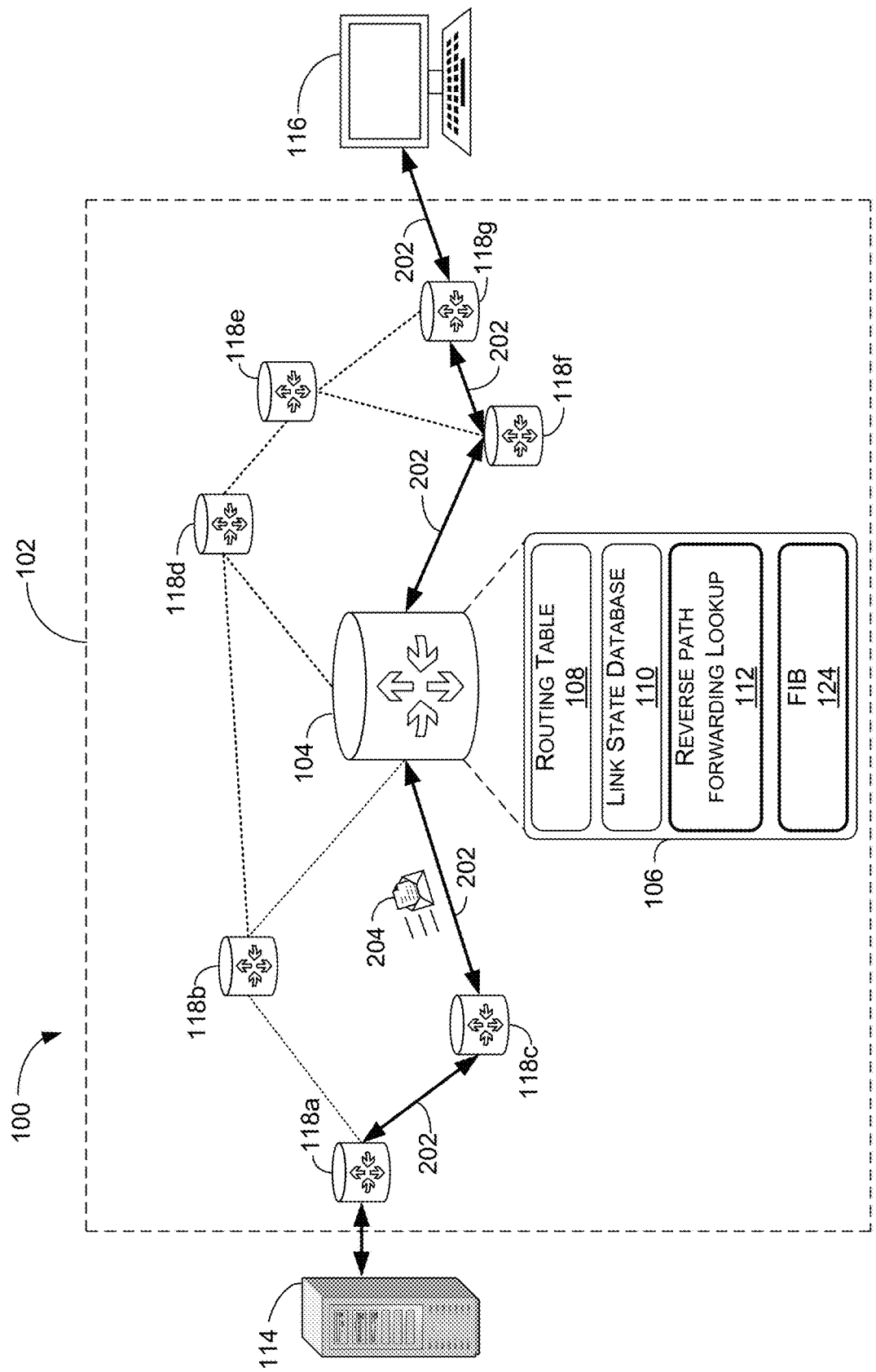
FIG. 2 illustrates a schematic of a computer network domain including a node configured to perform source validation in a symmetric routing environment.

FIG. 2 illustrates a schematic of the network 100 in a symmetric routing environment. Line 202 illustrates a network path from between the devices 114, 116. As discussed above, the device 114 can be a computer device such as a server, computer, or other of various computer devices. Similarly, device 116 can be one of various computer devices, such as a server, computer, etc. Also as discussed above, each of the devices 114, 116 can function as a source or as a destination, depending upon the direction of data flow.

As seen in FIG. 2, data flows from the device 114 to the device 116 along line 202 through various routers 118, 104. Data also returns from device 116 to device 114 along the same route 202 through the same routers 118, 104. This type of data routing can be referred to as a symmetric routing environment because the data travels between devices along the same path in both directions. In such a symmetric routing environment, Reverse Path Forwarding (RPF) can be employed to perform Source Address Validation (SAV) in order to ensure that data is being received from a valid network interface and, thereby, prevent a spoofing security threat in which a fraudulent node imitates a network node in order to load malicious software or data onto one or more devices connected with the network.

With continued reference to FIG. 2, router 104 receives a data packet 204, for example from router 118c. Because the data is traveling along a symmetric data path, reverse path forwarding can be employed to validate the source of the data packet. The node 104 can access the Reverse Path Forwarding Lookup table 112 to determine whether the data packet 204 was received on a valid interface. The node 104 performs a reverse path lookup on the data packet 204 source address by comparing the source address with the Reverse Path Forwarding Lookup 112 to determine whether the data packet arrived from a valid source. If the Reverse Path Forwarding determines that the data packet 204 is from a valid source, then the data packet is sent to the next-hop 118f. If the Reverse Path Forwarding determines that the data packet 204 is not received on a valid RPF interface, then the data packet 204 is held pending further analysis as described below. Reverse Path Forwarding works in a symmetric routing environment because the source from which the data packet 204 is received is also a forwarding node when data travels in the opposite direction. Therefore, the router 104 can check its Forwarding Information Base (FIB) 122 to determine whether the interface (router 118c) is on which the packet was received is a forwarding next-hop interface for the packet source.

Figure 3:
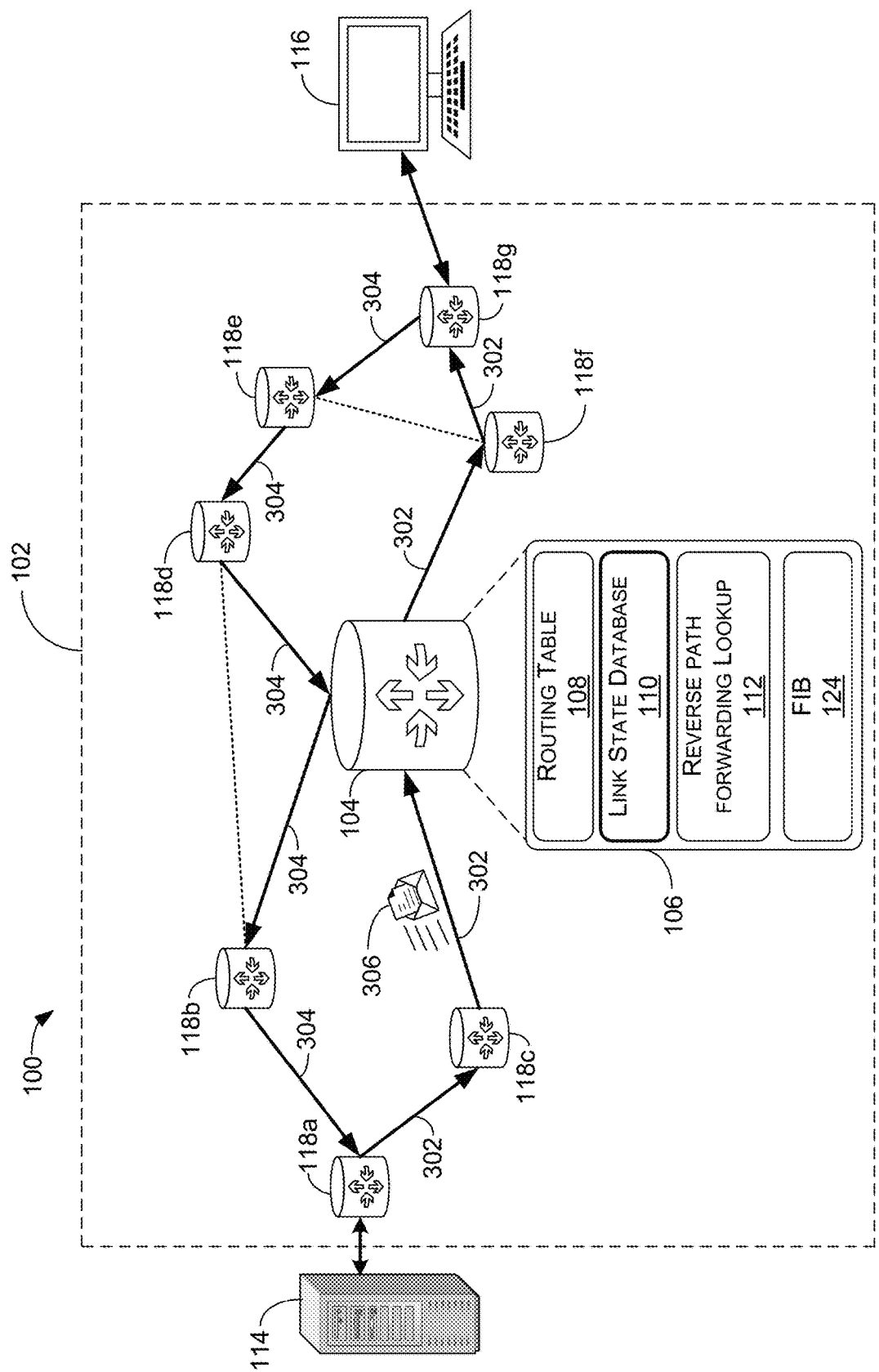
FIG. 3 illustrates a schematic of a computer network domain including a node configured to perform source validation in an asymmetric routing environment.

FIG. 3 illustrates a schematic of the network 100 in an asymmetric data routing environment. In some scenarios it may be beneficial for data to flow along a first path in one direction and then return along a different path. Such data routing is referred to as asymmetric data routing. In FIG. 3, it can be seen that data flows from device 114 to device 116 along a route 302. Data flows from device 116 to device 114 along a path 304 that is different from the path than the path 302. In this example, router 118c sends a data packet 306 to the router 104 along the first path 302. Because the data packet 306 is coming from a path 302 that is different from the path 304, reverse path forwarding cannot be used to perform Source Address Validation (SAV). In an asymmetric routing environment, the router 104 cannot determine that the data packet 306 is invalid when the Reverse Path Forwarding (RPF) fails in performing a valid SAV, as described above.

In this case of asymmetric routing, the router 104 will recognize that the reverse path forwarding has failed to validate the interface. The router 104 will then access the Link State Database (LSDB) and routing table 108 to determine whether the data packet 306 was sent from a valid path on the network 100. The router 104 will compute next-hops from the source router of the route in the domain 102 by performing a Shortest Path First (SPF) calculation rooted at the source router. The link-states of the source router 118a are available in the IS-IS or OSPF Link State Database 110. In one embodiment, the reverse Path Forwarding Lookup 112 can then be updated to allow the additional next-hop interfaces in the Reverse Path Forwarding Lookup of the source address. The updating of the Reverse Path Forwarding Lookup 112 is optional and in one embodiment would be applicable to IGP domains with asymmetric routing.

In another embodiment, an SPF computation can be performed rooted at the local router 104, but using the reverse metrics for all of the link costs, which can be referred to as a reverse Shortest Path First (reverse SPF). This can be achieved by running a normal SPF algorithm but using the link cost in the direction from the next-hop back toward the root instead of the link cost in the direction away from the root toward the next-hop.

Figure 4:
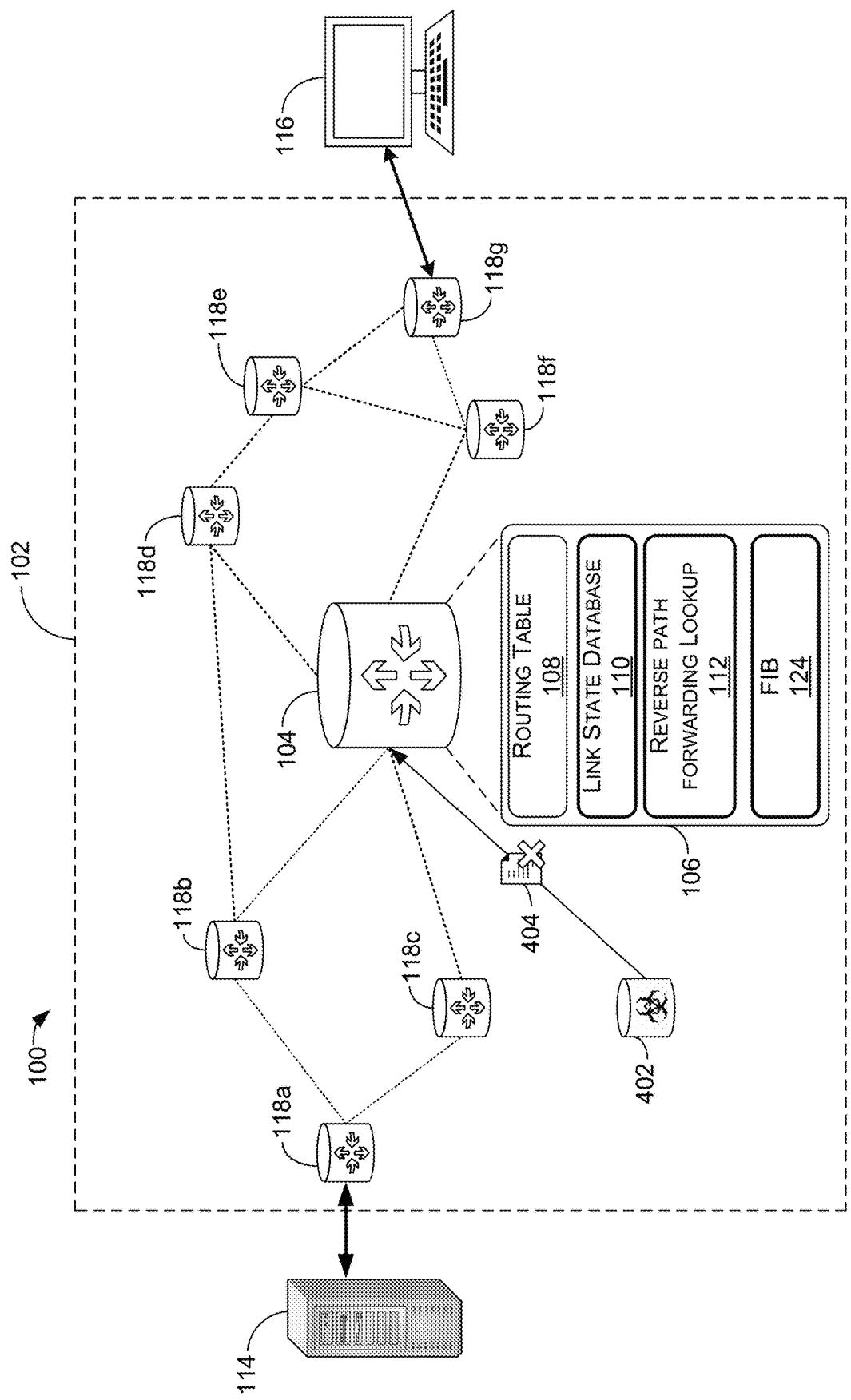
FIG. 4 illustrates a schematic of a computer network domain including a node configured to perform source validation in order to prevent routing of a malicious data packet.

FIG. 4 illustrates a schematic of the computer network 100 in which a "spoofing" attack is being attempted. FIG. 4 shows a malicious, fraudulent router 402, which is trying to impersonate a valid router of the network 100. The fraudulent router 402 sends a malicious data packet 404 to the router 104. The malicious data packet could include, malware such as phishing data, ransomware, spyware, etc. The router 104 will first perform Reverse Path Forwarding by accessing the Reverse Path Forwarding Lookup 112 and FIB 124 to determine whether the data packet 404 was received from a node leading to its source. This Reverse Path Forwarding will, of course, fail because the data packet 404 did not come from a path leading to its source. Then, the router 104 will access the Link-State Database 110 and Routing Table 108 and perform an SPF calculation rooted at the source router to determine whether the data packet 404 came from an interface that is from the source router for the packet source in the network 100. This too will fail, because the data packet 404 is not being received on an interface from the source network to the computing router. In this case, the data packet 404 will be dropped, thereby preventing any malicious damage to any of the devices of the network 100.

Figure 5:
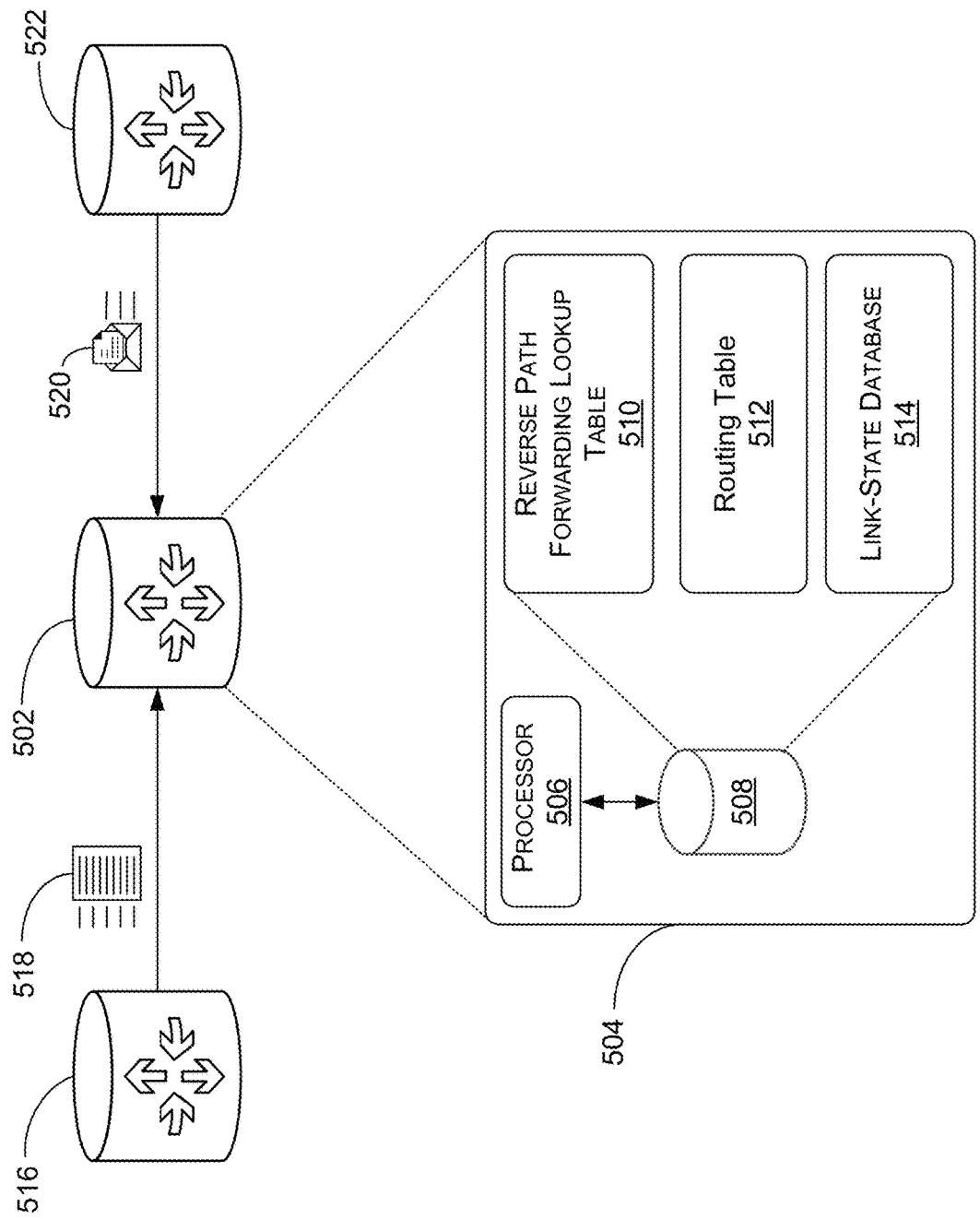
FIG. 5 illustrates a schematic of a network router including hardware, software and computer storage configured to perform source address validation.

FIG. 5 is a schematic view of a router 502 showing various components 504 of the router for performing Source Address Validation in a network. In one embodiment, the router 502 can include a processor 506, which can include computer circuitry and/or software for performing operations that include performing Source Address Validation (SAV). In one embodiment, the router can also include computer memory 508. The computer memory can be, for example, digital solid-state memory, magnetic memory, etc. and may provide computer storage for storing one or more databases. In one embodiment, the computer memory 508 can store a Reverse Path Forwarding Lookup Table 510, a routing table 512, a Link-State Database 514, and a Forwarding Information Base (FIB) 524.

In a computer networking environment, such as described above, the router 502 receives network routing information from one or more routers 516 of a network (not shown in FIG. 5). In one embodiment, the router 502 receives a Link-State Advertisement (LSA) 518 from the router 516. The LSA 518 can include information regarding valid network paths and next-hops of a relevant network. The router 502 can store this routing information in the Link-State Database 514, which can be stored in the computer memory 508.

The router 502 can receive a data packet 520 from a router 522. Upon receiving the data packet 520, the router 502 can perform a Reverse Path Lookup to determine whether the data packet arrived from a valid interface (e.g., whether the router 522 is a valid interface from which to receive packets with the IP source address). The router 502 can employ the processor 506 to access the Reverse Path Forwarding Lookup Table 510 to determine whether the data packet 520 was received from an interface leading to the source based on information in a header of the data packet. As mentioned above, such Reverse Path Forwarding checking can only validate the source of the data packet 520 in a symmetric routing environment. If the Reverse Path Forwarding validates that the data packet 520 was received from a path leading to the valid source, then the router 502 will forward the data packet to a next-hop. If the Reverse Path Forwarding check fails, then the data packet 520 will not yet be forwarded to the next-hop and further Source Address Validation will be performed for future packets from the source address. At this point, the data packet 520 will not be queued while further Source Address Validation is pending.

If the Reverse Path Forwarding fails to identify the data packet 520 as coming from a valid source, then the router 506 will employ the processor to perform an SPF calculation using the Link-State Database 514 and routing table 512 stored in the memory 508 to determine whether the data packet came from a valid network path. If the data packet 520 did arrive from a valid network path, then the data packet 520 will be sent to the next-hop. If the data packet 520 did not arrive from a valid network path, then the data packet 520 will be dropped.

Figure 6:
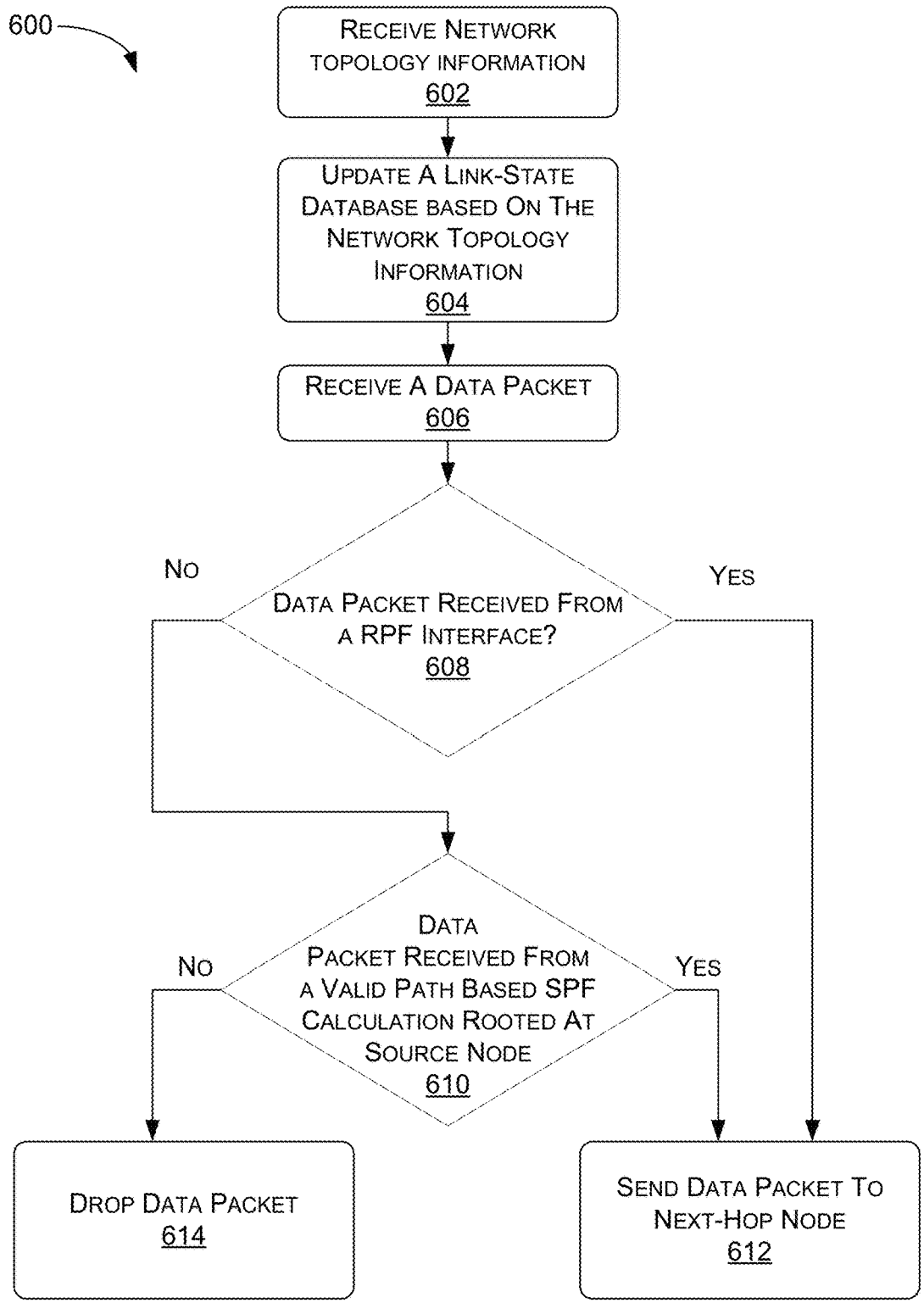
FIG. 6 illustrates a method for performing source address validation according to an embodiment.
Figure 7A:
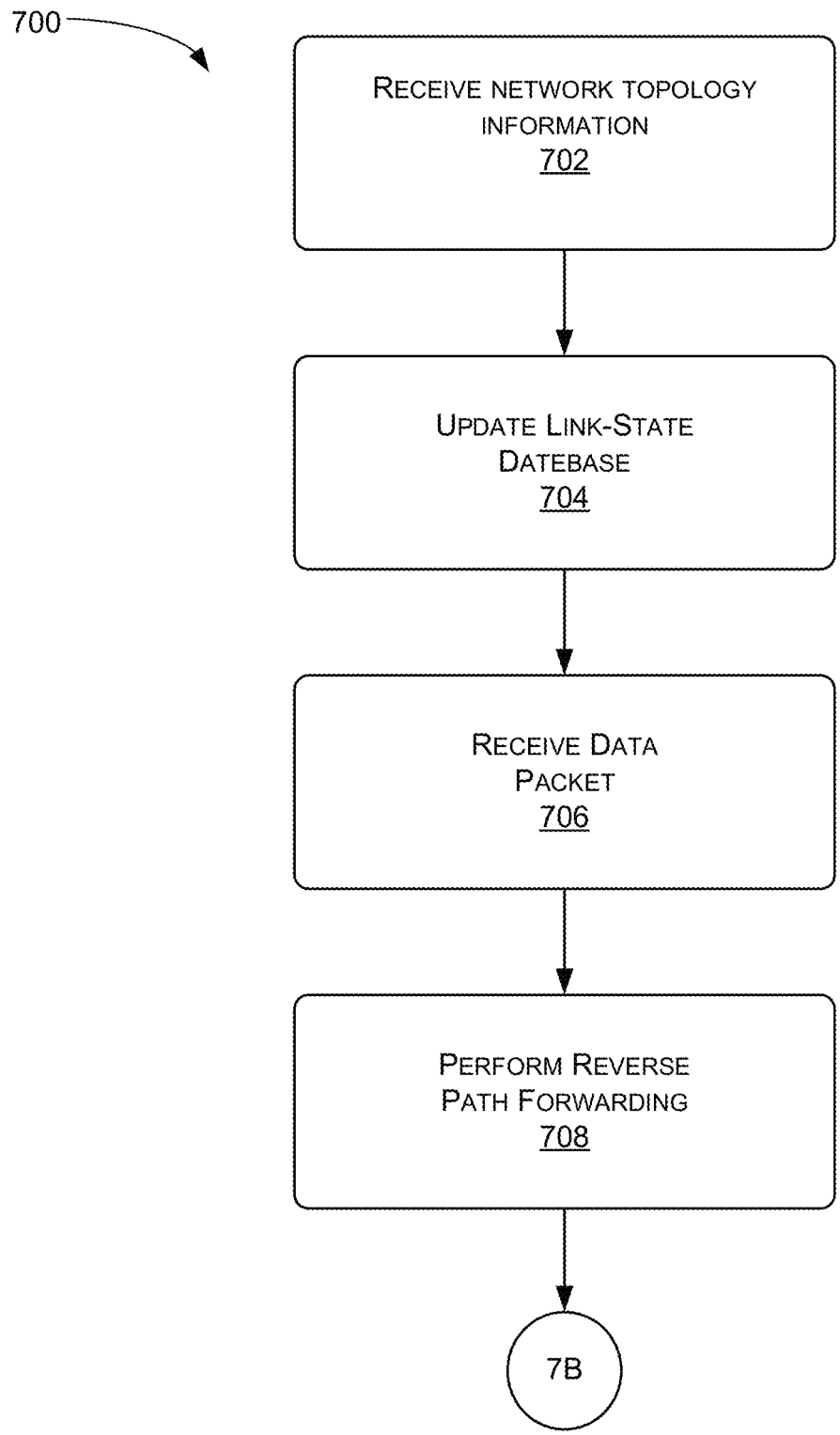
FIGS. 7A-7B illustrate a method for performing source address validation according to another embodiment.
Figure 7B:
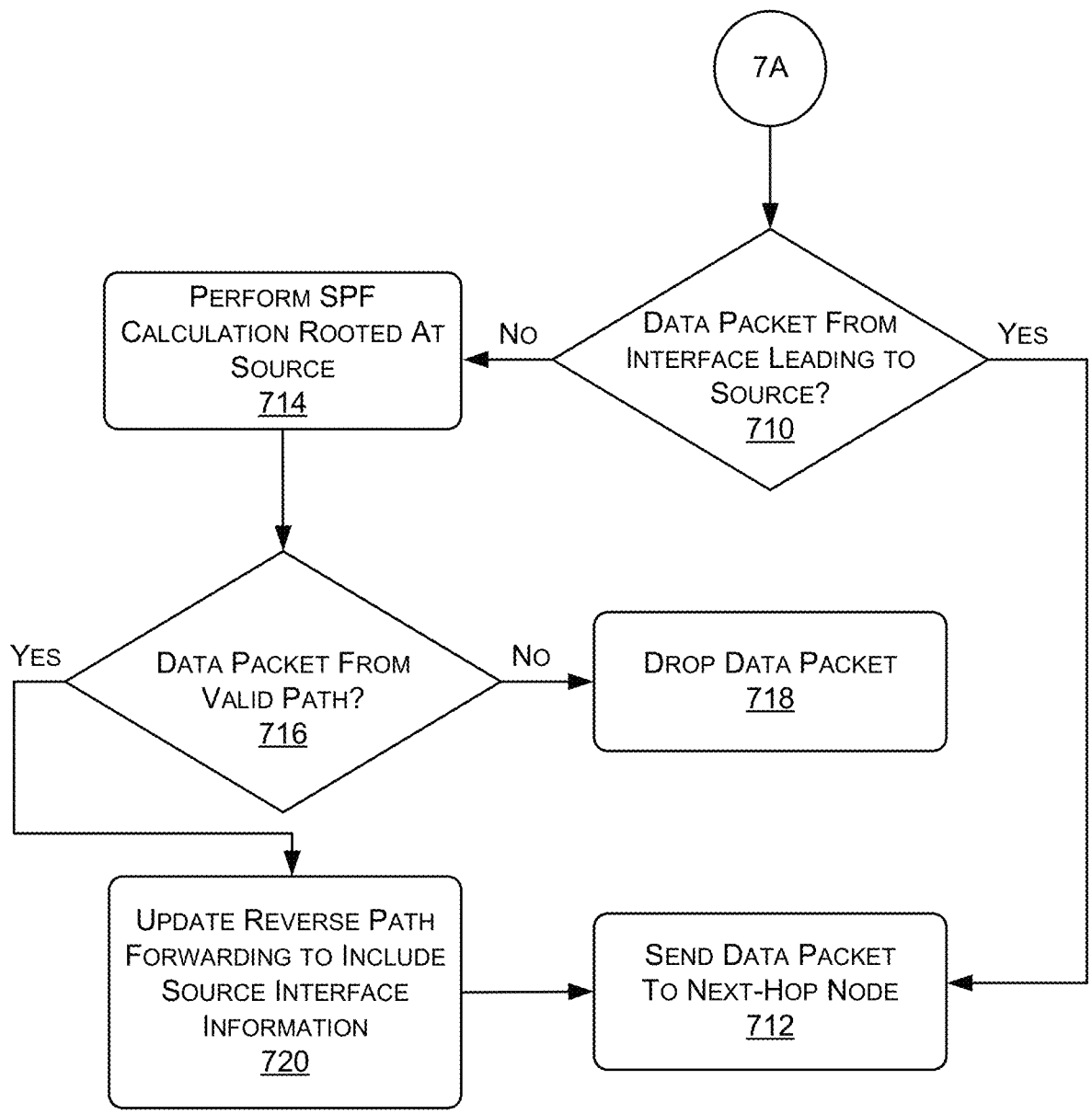

FIGS. 6 and 7A-7B illustrate flow diagrams of example methods 600 and 700 that illustrate aspects of the functions performed at least partly by the devices in the computer network architecture as described in FIGS. 1-5. The logical operations described herein with respect to FIGS. 6 and 7A-7B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6 and 7A-7B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of a method 600 according to an embodiment. Network topology information is received 602. The network topology information can be received by a network switching device of a computer network. In one embodiment, the network topology information can be received by a node of the computer network such as from another network switching device or router. In one embodiment the network topology information can include Link-State Database information, which in one embodiment can be one or more Link-State Advertisements received from one or more network switches or routers of the computer network. A Link-State Database of the receiving network switching device is updated with the received network topology information 604 by loading the received network topology information into the computer memory of the receiving network switching device, where it can be accessed for later retrieval. The Link-State Database can be stored in software or hardware-based computer storage of the network switching device. A data packet is received 606 by the network switching device. The data packet can be received from one or more nodes of the computer network, such as one or more network switching devices or routers of the computer network. A determination is made as to whether the data packet is from a Reverse Path Forwarding Interface 608. This can be accomplished by checking the source address of the received data packet to determine whether the data packet was received from a valid RPF interface. If it is determined that the packet was received from a valid Reverse Path Forwarding Interface (YES), then the data packet is sent to a next-hop node. This determination can be made based on an examination of the source address of the received data packet and comparison with an RPF lookup table. The next-hop node can be a network switching device or router of the computer network.

If it is determined that the data packet was not received from a valid Reverse Path Forwarding (RPF) Interface (NO), then a determination is made as to whether the data packet was received from a valid path from the source router based an SPF computation rooted at the source node 610. The network topology information stored in the Link-State Database includes updated information about valid network routes. The network topology information in the Link-State Database can be accessed and examined to determine whether the node from which the data packet was received is in fact in the path from the source node to the current node of the computer network. This can be achieved by comparing the network address and routing information of the data packet with the information from the Link-State Database and performing a Shortest Path First (SPF) computation rooted at the source router or switch. If the data packet was received from a valid path (YES), then the data packet is sent to a next-hop node of the network 612. The network next-hop node can be a network switching device or router identified by the network address and routing information of the data packet. If, on the other hand, it has been determined that the data packet was not received from a valid node (NO) as determined by the SPF calculation rooted at the source node (router or switch), then the data packet can be dropped to avoid transmitting malicious data such as from a "spoofing" type of attack.

FIGS. 7A-7B collectively are flow diagrams illustrating a method 700 according to another embodiment. Network topology information is received 702. The network topology information can be received by one or more network switching devices of a computer network and may be received as one or more Link State Advertisements (LSAs) from the one or more network switching devices. The network topology information may include Link-State Database information regarding valid routes of a computer network. A Link-State Database is updated with information regarding the received network topology information 704. The Link-State Database can be a database stored in computer memory of the receiving network switching device. In one embodiment, the Link-State Database can be stored in computer hardware such as in an Application Specific Integrated Circuit embodied in the receiving network switching device. In another embodiment, the Link-State Database can be stored in software, such as in central processing unit (CPU) memory embodied in the receiving network switching device.

A data packet is received by the receiving network switching device 706. The data packet can be received from a node of the data network. In one embodiment, the data packet can be received from a network switching device or router connected with the computer network. The data packet can include source address and forwarding information as well as other IP protocol information.

A Reverse Path Forwarding (RPF) check is performed 708 regarding the received data packet to determine whether the data packet was received from a valid source node by determining if the source node is also a forwarding node based on the source and destination information of the received data packet. The Reverse Path Forwarding check can be performed by performing a Reverse Path Forwarding Lookup to determine whether the data packet arrived from a node leading to a source. A determination is made as to whether the data packet was received from an interface leading to the source 710. If it is determined that the data packet was received from an interface leading to the source (YES), then the data packet is sent to a next-hop node 712.

If it is determined that the data packet was not received from an interface leading to the source (NO), then a Shortest Path First (SPF) calculation is performed rooted at the source node. The performance of the SPF calculation can be performed based at least in part upon information retrieved from the Link-State Database which can be stored in memory in the receiving network switching device as discussed above in such a manner that the valid routing information can be retrieved for comparison with the routing information associated with the received data packet.

A determination is made as to whether the data packet was received from a valid network path 716. This determination can be based on the search of the Link-State Database and a comparison of the information of the Link-State Database with the routing information associated with the received data packet to perform an SPF calculation starting from the source node (router or switch). If the data packet was not received from a valid path (NO), then the data packet is dropped 718 in order to prevent a security threat such as from a "spoofing" attack. If the data packet did arrive from a valid path (YES), then a Reverse Path Forwarding Lookup table is updated to include information regarding source interface node 720, and the data packet is sent to the next-hop 712.

Figure 8:
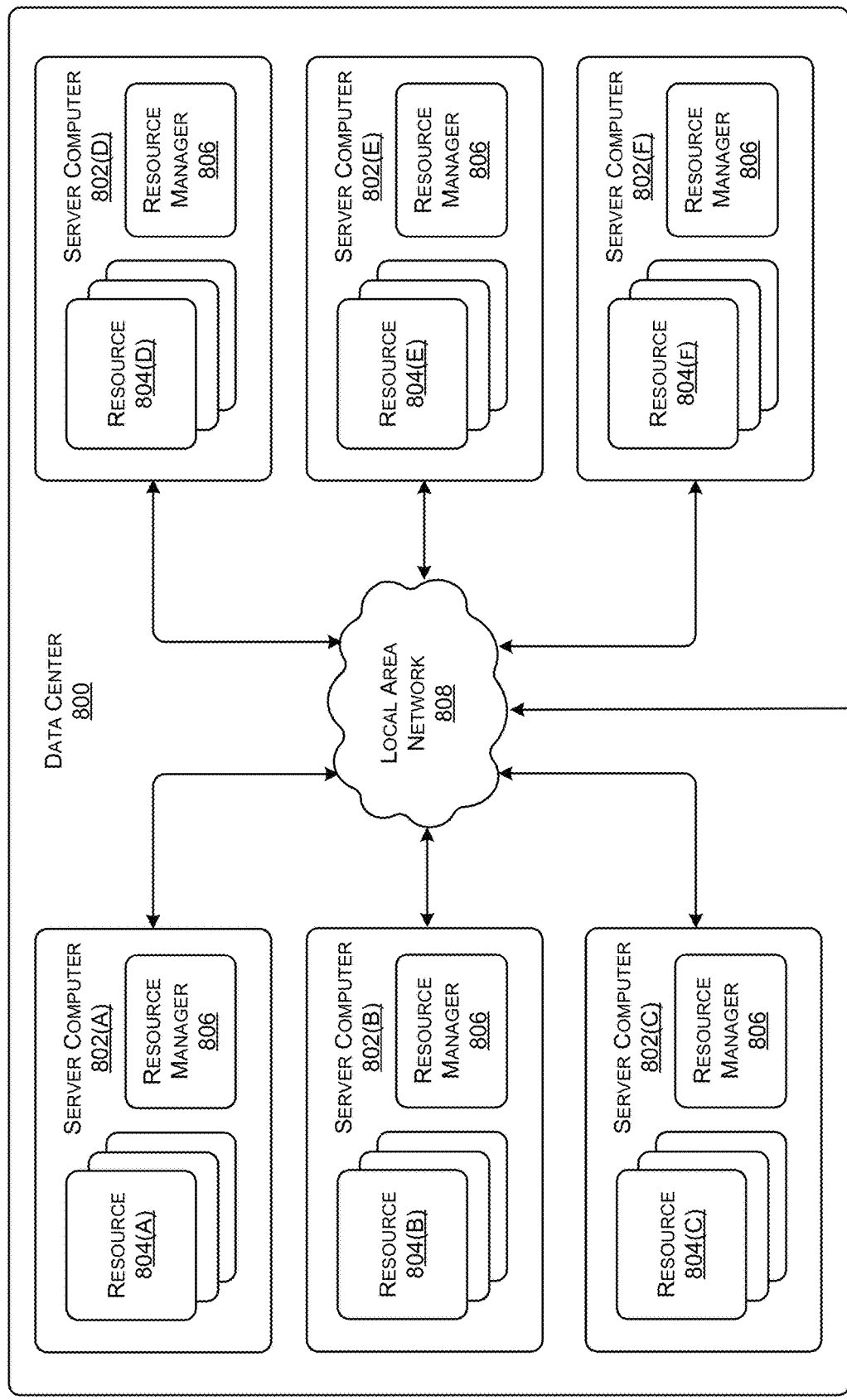
FIG. 8 illustrates a computing system diagram illustrating a configuration for a data center that can be utilized to implement aspects of the technologies disclosed herein.

FIG. 8 is a computing system diagram illustrating a configuration for a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/or server computers 802 may include, or correspond to, any type of networked device described herein. Although described as servers, the server computers 802 may comprise any type of networked device, such as servers, switches, routers, hubs, bridges, gateways, modems, repeaters, access points, etc. In some embodiments, the data center 800 and/or local area network 808 can correspond with the domain 102 of FIGS. 1-4, or could correspond to the network 100 of FIGS. 1-4.

The server computers 802 can be standard tower, rack-mount, or blade server computers configured appropriately for providing computing resources. In some examples, the server computers 802 may provide computing resources 804 including data processing resources such as virtual memory (VM) instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load-balancing devices or other types of network infrastructure components can also be utilized for balancing a load between data centers 800, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized.

In some examples, the server computers 802 may each execute one or more application containers and/or virtual machines to perform techniques described herein. In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a server computer 802 of a data center 800 that can be utilized to implement the technologies disclosed herein will be described below with regard to FIG. 9.

Figure 9:
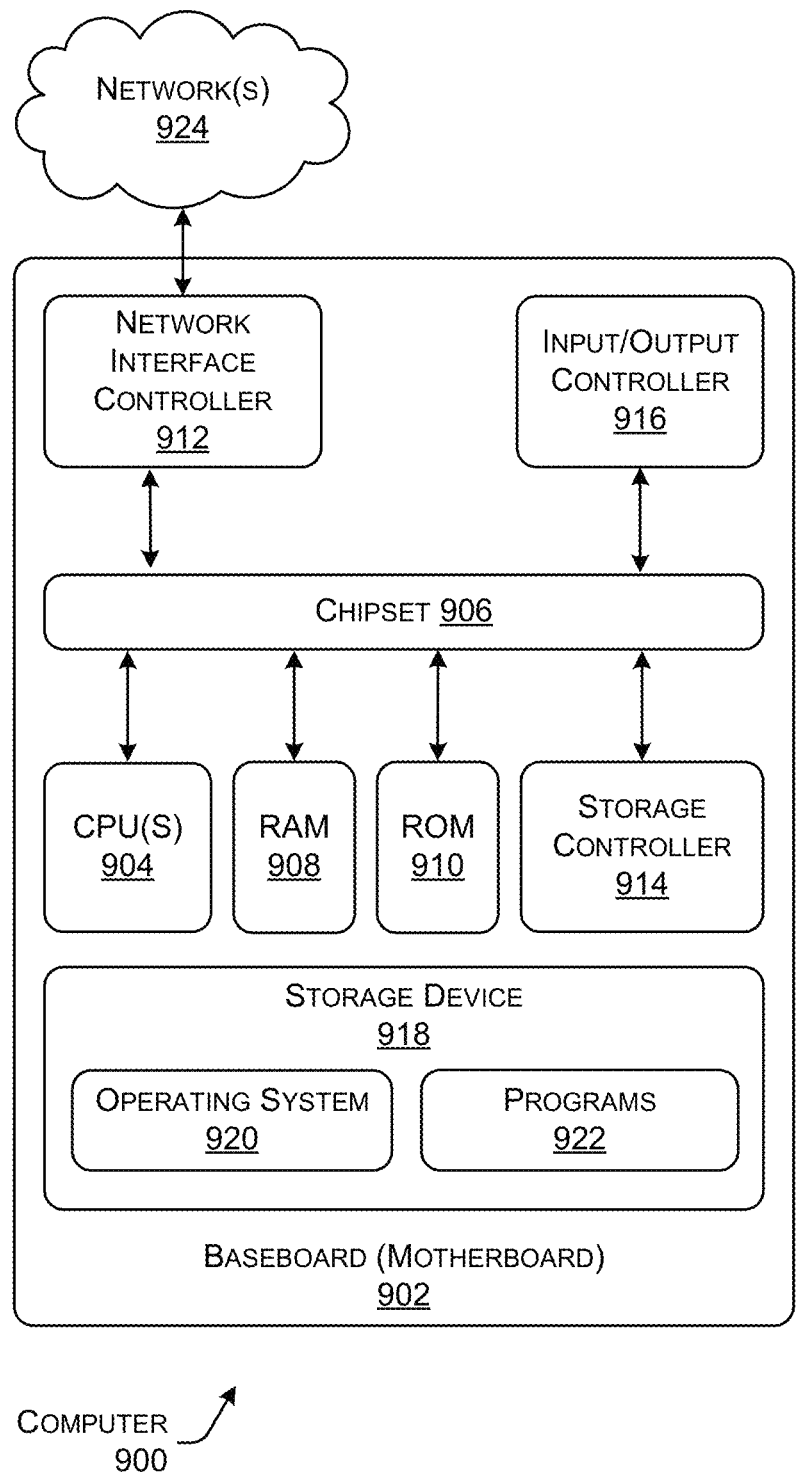
FIG. 9 is a computer architecture diagram showing an illustrative computer hardware architecture for implementing a computing device that can be utilized to implement aspects of the various technologies presented herein.

FIG. 9 shows an example computer architecture for a server computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The server computer 900 may, in some examples, correspond to the server computer 802 described herein above with reference to FIG. 8, and may comprise networked devices such as servers, switches, routers, hubs, bridges, gateways, modems, repeaters, access points, etc. In one embodiment, the computer 900 may correspond with the components 504 of the router 502 of FIG. 5. In one embodiment, the computer 900 may correspond with devices 114, 116 of FIGS. 1-4.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 924, or network 808 of FIG. 8. The chipset 906 can include functionality for providing network connectivity through a Network Interface Controller (NIC) 912, such as a gigabit Ethernet adapter. The NIC 912 is capable of connecting the computer 900 to other computing devices over the network 924, 808 or network 100 of FIGS. 1-4. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-7. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may include one or more hardware processors 904 (processors) configured to execute one or more stored instructions. The processor(s) 904 may comprise one or more cores. Further, the computer 900 may include one or more network interfaces configured to provide communications between the computer 900 and other devices, such as the communications described herein as being performed by the routers or switches 104, 118. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for performing Source Path Validation in a symmetric or asymmetric networking environment. The programs 922 may comprise any type of program that cause the computer 900 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a network switching device connected with a computer network, the method comprising:
    receiving by the network switching device, network topology information from a node of the network;
    updating a link-state database of the network switching device based on the network topology information;
    receiving a data packet associated with a data flow between one or more nodes of the computer network and the network switching device;
    determining whether the data packet was received from a reverse path forwarding interface;
    in response to determining that the data packet was received from a reverse path forwarding interface, sending the data packet from the network switching device to a next-hop node of the computer network;

in response to determining that the data packet was not received from a reverse path forwarding interface performing a shortest path first calculation rooted at a router advertising a source network of the data packet;

determining whether the data packet was received from a valid path of the computer network based on the shortest path first calculation;

in response to determining that the data packet was received from a valid path, sending the data packet from the network switching device to the next-hop node of the computer network; and in response to determining that the data packet was not received from a valid path of the computer network, dropping the data packet.

2. The method as in claim 1, wherein the network topology information was received from a node advertising the network topology information.

3. The method as in claim 1, wherein the network topology information is received from a node advertising its own link state database.

4. The method as in claim 1, wherein the network topology information is received from a node that received network topology information from another node of the computer network that advertised network topology information.

5. The method as in claim 1, wherein the data packet was sent from a source, the method further comprising computing next-hop nodes of the computer network for the source.

6. The method as in claim 1 further comprising:
determining that the data packet was received from a valid path; and
in response to determining that the data packet was received from a valid path, adding first hop neighbors for the path to a reverse path forwarding lookup database of the network switching device.

7. The method as in claim 1, wherein the shortest path first calculation is performed using a reverse shortest path first calculation.

8. A network switching device of a computer network, the network switching device comprising:
one or more processors; and
one or more non-transitory computer-readable media storing computer-executable instructions that, when executed by the one or more processors, cause the one or more processors to perform operations comprising:
receiving by the network switching device, network topology information from a node of the network;
updating a link-state database of the network switching device based on the network topology information;
receiving a data packet associated with a data flow between one or more nodes of the computer network and the network switching device;
determining whether the data packet was received from a reverse path forwarding interface;
in response to determining that the data packet was received from a reverse path forwarding interface, sending the data packet from the network switching device to a next-hop node of the computer network;
in response to determining that the data packet was not received from a reverse path forwarding interface, performing a shortest path first calculation rooted at a router advertising a source network of the data packet;
determining whether the data packet was received from a valid path of the computer network based on the shortest path first calculation;

in response to determining that the data packet was received from a valid path, sending the data packet from the network switching device to the next-hop node of the computer network; and in response to determining that the data packet was not received from a valid path of the computer network, dropping the data packet.

9. The network switching device as in claim 8, wherein the network topology information was received from a node of the computer network advertising the network topology information.

10. The network switching device as in claim 8, wherein the network topology information is received from a node of the computer network advertising its own link state database.

11. The network switching device as in claim 8, wherein the network topology information is received from a node that received network topology information from another node that advertised network topology information.

12. The network switching device as in claim 8, wherein the data packet was sent from a source of the computer network, the operations further comprising computing next-hops for the source network of the data packet in the computer network.

13. The network switching device as in claim 8, further comprising determining that the data packet was received from a valid path; and
in response to determining that the data packet was received from a valid path, adding first hop neighbors for the path to a reverse path forwarding lookup database.

14. The network switching device as in claim 8, wherein the shortest path first calculation is performed using a reverse shortest path first calculation.

15. One or more non-transitory computer-readable media storing computer-executable instructions that, when executed by one or more processors, cause the one or more processors to perform operations comprising:
receiving by a network switching device, network topology information from a node of a network;
updating a link-state database of the network switching device based on the network topology information;
receiving a data packet associated with a data flow between one or more nodes of the computer network and the network switching device;
determining whether the data packet was received from a reverse path forwarding interface of the computer network;
in response to determining that the data packet was received from a reverse path forwarding interface of the computer network, sending the data packet from the network switching device to a next-hop node of the computer network;
in response to determining that the data packet was not received from a reverse path forwarding interface of the computer network, performing a shortest path first calculation rooted at a router advertising a source network of the data packet;
determining whether the data packet was received from a valid path of the computer network based on the shortest path first calculation;
in response to determining that the data packet was received from a valid path, sending the data packet from the network switching device to the next-hop node of the computer network; and in response to determining that the data packet was not received from a valid path of the computer network, dropping the data packet.

16. The one or more non-transitory computer-readable media as in claim 15, wherein the network topology information was received from a node of the computer network advertising the network topology information.

17. The one or more non-transitory computer-readable media as in claim 15, wherein the network topology information is received from a node of the computer network advertising its own link state database.

18. The one or more non-transitory computer-readable media of claim 15, wherein the network topology information is received from a node that received network topology information from another node of the computer network that advertised network topology information.

19. The one or more non-transitory computer-readable media of claim 15, wherein the data packet was sent from a source of the computer network, the operations further comprising computing next-hops for the source.

20. The one or more non-transitory computer-readable media of claim 15, further comprising:
    determining that the data packet was received from a valid path of the computer network; and
    in response to determining that the data packet was received from a valid path of the computer network, adding first hop neighbors for the path to a reverse path forwarding lookup database.

* * * * *